United States Patent [19]
Mayr et al.

[11] Patent Number: 4,458,476
[45] Date of Patent: Jul. 10, 1984

[54] METHOD AND DEVICE FOR MANUFACTURING OPTICAL TRANSMISSION ELEMENTS

[75] Inventors: Ernst Mayr, Starnberg; Ulrich Oestreich; Gernot Schoeber, both of Munich, all of Fed. Rep. of Germany

[73] Assignee: Siemens Aktiengesellschaft, Berlin & Munich, Fed. Rep. of Germany

[21] Appl. No.: 380,132

[22] Filed: May 20, 1982

[30] Foreign Application Priority Data

May 27, 1981 [DE] Fed. Rep. of Germany ....... 3121222

[51] Int. Cl.³ ..................... H01B 13/24; H01B 13/02
[52] U.S. Cl. ........................................ 57/294; 57/7; 57/293; 57/297; 264/173; 264/174
[58] Field of Search ................. 57/6, 7, 293, 294, 295, 57/297; 264/103, 174, 173

[56] References Cited

U.S. PATENT DOCUMENTS

| | | | |
|---|---|---|---|
| 4,359,857 | 11/1982 | Oestreich | 57/293 X |
| 4,366,667 | 1/1983 | Oestreich | 57/7 |
| 4,386,496 | 6/1983 | Oestreich | 57/293 |
| 4,414,165 | 11/1983 | Oestreich et al. | 264/174 X |

Primary Examiner—John Petrakes
Attorney, Agent, or Firm—Hill, Van Santen, Steadman & Simpson

[57] ABSTRACT

A method and device for manufacturing optical transmission elements which contains a SZ-stranded bundle of several optical waveguides received in a tubular jacket characterized by stranding the waveguides into the bundle while they are moving in a vertical direction, applying a filling material to the waveguides adjacent a stranding point to prevent the unstranding of the bundle until at least the tubular jacket has been applied. Preferably, the application of the jacket is by extruding the jacket onto the bundle and the method can include the application of an additional filling material to complete the filling of the jacket.

16 Claims, 2 Drawing Figures

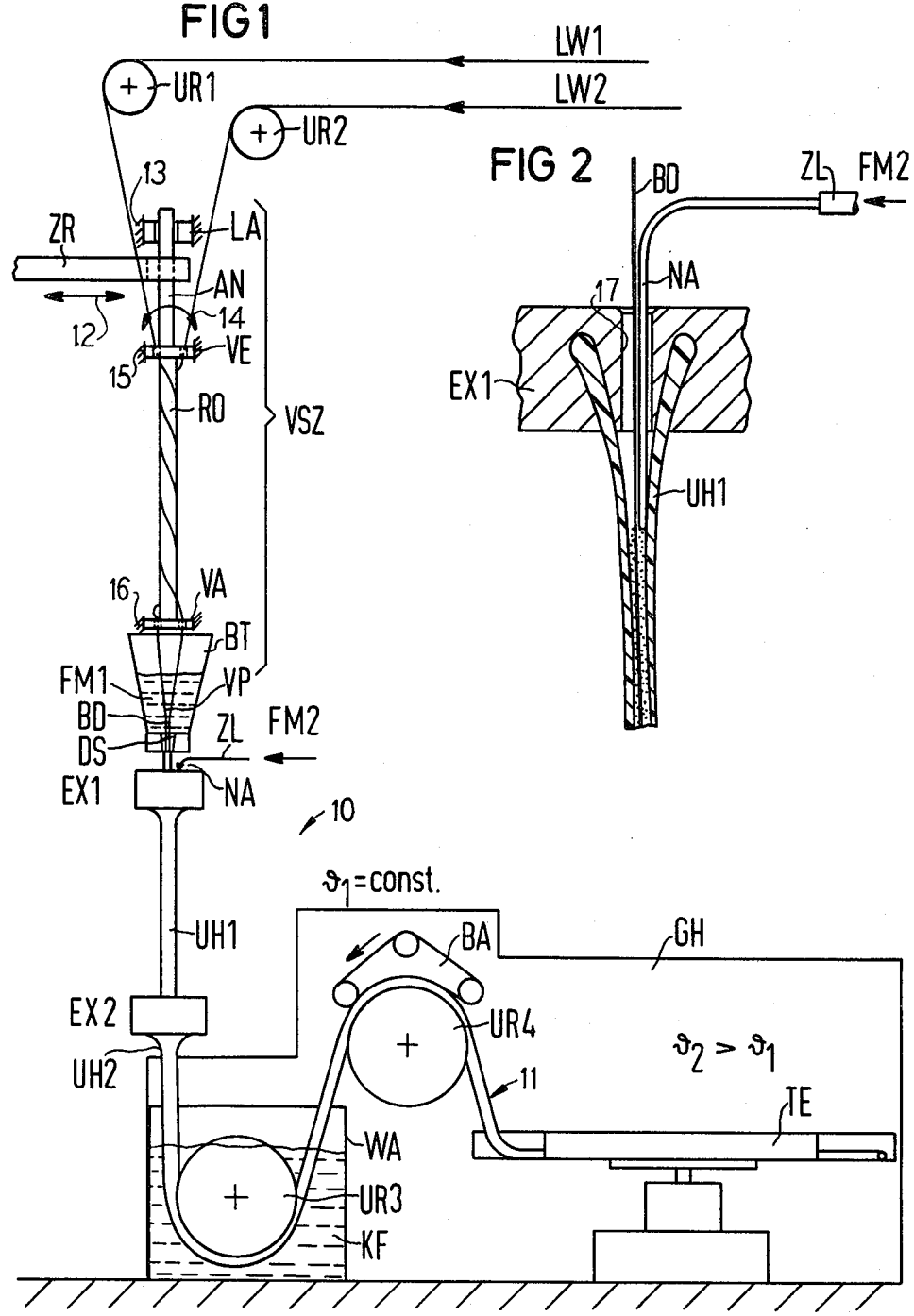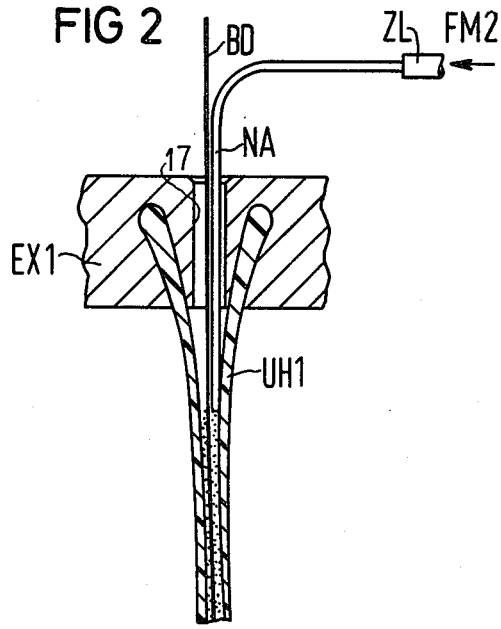

METHOD AND DEVICE FOR MANUFACTURING OPTICAL TRANSMISSION ELEMENTS

BACKGROUND OF THE INVENTION

The present invention is directed to a method for manufacturing an optical transmission element which contains a SZ-stranded bundle of several optical waveguides which bundle is disposed in a tubular covering or jacket and to a device for manufacturing the element.

In the case of SZ-stranding of waveguides or elements, a danger exists that the stranded product will become unstranded or unwound at the reversal location of the stranding or twisting direction. It is known to prevent this untwisting or unwinding by virtue of the fact that a retaining binding or coil is applied which prevents the stranded elements from again changing the configuration forced upon them by the stranding operation. In the case of stranding very sensitive optical waveguides, a difficulty exists because the waveguides can be deformed in a undesirable manner by this retaining binding or coil. However, on the other hand, it must be insured that the fiber shaped optical waveguides are prevented from unstranding at least until the application of a tubular cover or jacket which surrounds the stranded bundle.

SUMMARY OF THE INVENTION

The present invention is directed to providing a method and device for SZ-stranding a plurality of optical waveguides such as fibers into a bundle of SZ-stranded elements and subsequently enclosing the bundle in a tubular jacket or covering which method and device prevents the optical waveguides from becoming unstranded after the SZ-stranding operation.

To accomplish these goals and objects, the present invention is directed to an improvement in a method and device for manufacturing optical transmission elements which contains a SZ-stranded bundle of several optical waveguides which are received in a tubular jacket or covering which method includes the steps of SZ-stranding a plurality of waveguides into a bundle of SZ-stranded waveguides at a stranding point and then applying a tubular jacket to the bundle. The improvements comprise that the SZ-stranding and applying of the jacket is accomplished while the waveguides and bundle are traveling in a vertical direction and includes applying a filling material to the waveguides near the point of stranding and prior to the applying of the jacket. The applying of the filling compound which adheres to the waveguide will prevent the optical waveguides of the bundle from becoming unstranded at least for a short period of time. Since the filling compound is frequently always required for the purpose of sealing a loosely fitting bundle within a outer covering or jacket, neither additional materials or additional work will be needed to perform the present method and thus the present method and the present device will not increase the cost of the optical element. The otherwise necessarily and relatively complicated spinning devices for applying the retaining coil or binding can be eliminated.

Preferably, the filling compound is contained in a receptacle, which has an opening in the bottom and the bundle is passed through the receptacle in a vertical direction to move through the opening which will act as a stranding nipple. Preferably, the means for covering is an extrusion head which extrudes a heated plastic jacket onto the bundle and the device may include means for adding additional filling compounds into the extruded jacket which additional filling compound acts to accelerate the cooling of the jacket. It should also be noted that a second or additional jacket may be placed on the first mentioned jacket by a second extrusion means and that the multilayer jacket formed in this manner while traveling in a vertical direction is then introduced into cooling means such as a water bath.

BRIEF DESCRIPTION OF THE DRAWINGS

FIG. 1 is a schematic view of a device for forming an optical transmission element in accordance with the present invention; and FIG. 2 is an enlarged partial cross-sectional view of an extruding means for applying a tubular jacket onto a stranded bundle.

DESCRIPTION OF THE PREFERRED EMBODIMENTS

The principles of the present invention are particularly useful in a device generally indicated at 10 in FIG. 1 for forming an optical transmission element 11. The optical transmission element 11 contains an SZ-stranded bundle of several optical waveguides which are received in a tubular jacket.

The device 10 is illustrated as operating with only two fiber shaped optical waveguides, LW1 and LW2, which after being drawn from storage reels (not illustrated) are passed over deflection rollers UR1 and UR2 and brought into a vertically extending path. Each of the optical waveguides LW1 and LW2 are provided with corresponding protective layers or coating which may be rendered distinguishable by means of different identification such as by colors. In practice, more than the two waveguides are customarily stranded together into a bundle and expediently the number can be in a range of 2 to 12 optical waveguides. Preferably these waveguides are optical fibers.

In the illustrated embodiment of the device 10, an SZ-stranding is accomplished in a stranding region VSZ by means of a so-called tube store, which is composed of a tube RO which coacts with a first stranding disc VE and a second stranding disc VA. Thus, during stranding, the tube RO is already covered with a stranding material which is twisting in one direction and then in another direction. On the surface of the tube RO, the optical waveguides such as LW1 and LW2 are disposed and roll off of the tube and as a consequence, a torsion in the fibers during the stranding is avoided. The tube RO exhibits in the upper portion an extension AN, which is mounted for rotation in a frame 13 by a bearing LA. To rotate the tube RO, a toothed belt ZR engages a tooth wheel mounted on the extension AN and is connected to means which will move the belt in two directions indicated by the double arrow 12 so that the tube RO will be rotated both in a clockwise or in a counterclockwise direction as indicated by arrow 14. One of the two stranding discs such as VE is rigidly mounted on a frame 13 such as by a support 15 and has a bearing for rotatably receiving the vertically extending tube store RO. The other stranding disc VA is rigidly mounted on the tube RO and is mounted in the member 16 by a bearing which allows it to rotate in either a clockwise or counterclockwise direction. Each of the stranding discs VE and VA are provided with openings which correspond in number to the number of waveguides such as LW1 and LW2 which pass through the openings and are then twisted or wrapped around the tube RO as the tube is rotated in either direction. A more detailed discussion of the structure of the stranding unit composed of the tube store RO is provided in allowed U.S. patent application, U.S. Ser. No. 229,170, filed Jan. 28, 1981, which issued as U.S. Pat. No. 4,386,496 and is based on the same German application which resulted in German Auslegeschrift No. 30 06 054, and U.S. patent application, U.S. Ser. No. 229,169, filed Jan. 28, 1981, which issued as U.S. Pat. No. 4,359,857 and was based on the German application resulting in Offenlegungsschrift No. 30 06 055 and the specification of both of these applications are incorporated herein by reference.

As the waveguides LW1 and LW2 pass through the lower stranding discs VA, they will run together in a stranding point VP. This stranding point VP is disposed in the interior of the funnel shaped receptacle BT, which is filled with a corresponding filling compound or material FM1 which will adhere to the waveguides. The level of the filling compound is always maintained above the stranding point VP by an amount, which is approximately 10 to 50 mm. The filling compound is a thixotropic so that it does not run off and it prevents a dissociation of the stranding connection or union at the location of each reversal direction and will stand the minimum shear stress of approximately 200 to 500 $dyn/cm^2$.

In addition to containing the filling material FM1, the bottom of the container BT has an opening DS through which the bundle BD formed at the stranding point VP will pass. The opening DS will have an inside diameter approximately corresponding to the diameter of the bundle BD and thus simultaneously acts as a stranding nipple. It should be noted that the filling compound FM1 by adhering to the various waveguides will prevent any unstranding or untwisting of the stranded waveguides.

The filling compound which is mentioned hereinabove is thixotropic. Particular suitable materials for use as the filling compound are liquid paraffin, polybutene and "aerosil". *

* This is a trade name for ultrafine vapor depositor silica powder.

Immediately below the receptable BT, the device 10 is provided with means for providing or applying a coating or jacket to the bundle. As illustrated, this means preferably comprises a first extruder EX1, which will serve the purpose of applying the jacket or first coating UH1 to the bundle BD as the bundle passes through a bore 17 in the extruder EX1. The interior diameter of the covering or jacket UH1 is expediently 0.2 mm to 1 mm greater than the diameter of the bundle BD. Thus, the bundle BD will be loosely supported inside the interior covering or jacket UH1. In order to produce a filled cable or element, an additional filling compound or material FM2 of the above mentioned types will be required and is supplied by a feed line ZL to an injection needle NA. The quantity of the fillling compound is so selected that the entire interior space of the jacket UH1 is entirely build up with the filling compound FM1. For this purpose, it is expedient to provide a speed proportion control for controlling the quantity of the filling compound FM2 being supplied through the needle NA which control operates independently of the feed of the stranding device. The filling compound FM2 is expediently inserted in a cold state such as at room temperature and therefore the needle NA extends through the bore 17 in the extruder EX1 into that area where the newly extruded coating UH1 is being stretched in a converging conical shape as best illustrated in FIG. 2. Thus, the application of this additional filling material FM2 helps to cool the heated material that is being extruded from the extruder EX1.

In the illustrated embodiment of the device 10, a two layer jacket or covering is being provided by the means for applying and thus a second extruder EX2 is positioned to apply a second jacket or covering layer UH2 onto the layer UH1 in a tightly fitting fashion. It should be pointed out that not only is bundle BD and the first inner layer UH1 moving in a vertical direction, but the second layer which is being provided from the second extruder EX2 is also moving in a vertical layer. From the second extruder EX2, the element passes into a housing GH, which is maintained at a temperature $\theta 2$ which is greater than the exterior or the ambient temperature $\theta 1$ in which the stranding operation and the covering operation occurs. The transmission element after entering the housing GH1 enters into a trough WA in which a cooling fluid KF, such as water, is present. The trough WA has a deflection roller UR3 which will deflect the element after it has been cooled from a downward vertically extending direction back up to a substantially upward extending direction to an additional or second deflection roller UR4 which is arranged above the deflection roller UR3. This deflection roller UR4 is provided with a drawing off arrangement or element BA which is illustrated as a moving pressure belt which moves over a plurality of pulleys or sheaves. A rotating plate TE is provided within the housing GH and receives the element 11 and supports it as it is coiled in a horizontal layer of a large diameter. The coaction of the drawing off element BA, the deflection roller UR4 and the rotating plate TE forms a depositing device which is described in greater detail and is the subject of the invention described in copending U.S. patent application, Ser. No. 357,699, filed Mar. 12, 1982 which issued as U.S. Pat. No. 4,414,165 and was based on German application No. P 31 11 963.8 and assigned to the assignees of the present application. The disclosure of this copending application is incorporated by reference thereto.

In order for the stranding operation and method to be expediently accomplished, the following dimensions have been observed. The SZ-stranding is carried out with a long lay in a range between 100 and 500 mm and preferably the lay is approximately 300 mm. The stranding preferably proceeds with reversal locations at a distance of 8 to 10 lays.

The filling compound FM1 should expediently surround the stranding bundle BD on all sides. This is accomplished by all of the optical waveguides being completely covered by the filling material by the means for applying the filling material. This has the additional advantage of the optical waveguide such as LW1 and LW2 do not come into contact with the interior surface of the first covering UH1 and therefore a possible sticking or adherence of these waveguides to the interior layer is prevented.

While the oscillating or rotating tube store RO was disclosed and suggested for the SZ-stranding, it is also possible to use other types of oscillating drive stores for the stranding region VSZ. When introducing the optical waveguides LW1 and LW2 into the stranding device, there is a preferred advantage that these be introduced with a retarding or braking force. For example, the amount of this force should be in a range of approximately 0.1 N to 1 N which may be accomplished by braking means applied to the rollers such as UR1 and UR2 or to the spools or reels on which the waveguides have been wound.

When additional filling material, such as FM2 is introduced into the interior jacket UH1, it is expediently for it to be the same substance as the filling material FM1 provided in the receptacle BT.

The interior temperature $\theta 2$ in the housing GH is expediently stablized and kept at a specific value which corresponds to the intended contraction of the jacket layers following cooling of the jacket. Fluctuations of temperatures are not to exeed beyond the range of $\pm 1.5°$ C. The complete transmission element 11 is placed on the plate TE with a winding diameter or apporoximately $1300\pm 200$ mm. Since the optical waveguides, which are introduced into the stranding device, are under a specific braking force provided by retarding the flow of the fibers into the device. The fiber bundle BD always becomes placed on the inner radius of the bent or coiled jacket. This leads to a lenght of error amount of the fiber of approximately $2\times 10^{-4}$, which is compensated through the contraction of the jacket by cooling to the ambient temperature after termination of the fabrication.

The transmission element 11, which was provided on the plate TE, can be the core of the optical waveguide cable for which purposes the wall thicknesses of the jackets UH1 and UH2 are to be dimensioned correspondingly. However, it is also possible to employ the transmission element 11 as a basic bundle for an additional stranding operation in which several basic bundles of this type are stranded to form a larger optical waveguide cable and are surround by a common exterior cladding or sheath.

Although various minor modifications may be suggested by those versed in the art, it should be understood that we wish to embody within the scope of the patent granted hereon, all such modifications as reasonably and properly come within the scope of our contribution to the art.

We claim:

1. In a method for manufacturing an optical transmission element, which contains SZ-stranded bundle of several optical waveguides received in a tubular jacket, said method including the steps of SZ-stranding the plurality of waveguides into a bundle of SZ-stranded waveguides at a stranding point and then applying a tubular jacket to said bundle, the immprovements comprising said steps of SZ-stranding and applying the jacket being accomplished with the waveguides and bundle traveling in a vertical direction and the method including the additional step of preventing the unstranding of the waveguides of the bundle at least at the point of stranding and until the application and solidification of the jacket by applying an adhering filling material to the waveguides adjacent the stranding point, said adhering filling material holding the optical waveguides of the bundle together.

2. In a method according to claim 1, wherein the step of SZ-stranding is conducted with a long lay of in a range of between 100 to 500 mm.

3. In a method according to claim 2, wherein the step of SZ-stranding is conducted with a long lay having a length of approximately 300 mm.

4. In a method according to claim 1, wherein the step of stranding is carried out with equal distances between the points of the reversal locations, said distances being preferably 6 to 10 lays.

5. In a method according to claim 1, wherein the step of applying a filling material comprises providing a receptacle containing the filling material, said receptacle having an opening in the bottom and being positioned to surround the stranding point, and passing the waveguides through the stranding point and through the material in the receptacle and out the opening in the bottom of the receptacle.

6. In a method according to claim 1, which includes the step of applying additional filling material during the step of applying the jacket to the stranded bundle so that the entire interior of the jacket is filled with said material.

7. In a method according to claim 6, wherein the step of applying the jacket comprises providing an extrusion head, passing the bundle through a bore in the extrusion head and extruding a jacket around the bundle, said bundle and jacket being drawn to form a conical stretching zone in the jacket, and said step of applying additional filling material applying a cold filling material which is inserted in the area of the conical stretching zone to accelerate the cooling of the heated extruded material.

8. In a method according to claim 7, wherein the step of applying both filling compounds is carried out by a speed proportional control to ensure that the entire interior of the jacket is filled with material.

9. In a method according to claim 1, wherein the step of applying a jacket, applies a multi-layer jacket in succession.

10. In a method according to claim 9, wherein subsequent to applying the last layer, the method includes cooling the layers to approximately room temperature.

11. In a method according to claim 10, wherein the step of cooling is accomplished while the element of the jacket and bundle move in a vertical direction and subsequent to cooling, said element is deflected into a horizontal direction for depositing in a coil.

12. In a method according to claim 1, wherein the feeding of the optical waveguides into the stranding zone includes retarding the waveguides to provide a braking force thereto.

13. In a device for manufacturing an optical transmission element which contains an SZ-stranded bundle of several optical waveguides received in a tubular jacket, said device includes means for SZ-stranding a plurality of optical waveguides at a stranding point into a bundle of SZ-stranded waveguides and means for applying a jacket onto the stranded bundle, the improvements comprising said means for SZ-stranding and the means for applying a jacket being disposed to act on the waveguides and bundles while moving in a vertical direction and said device further including means for preventing unstranding of the bundle being disposed adjacent the stranding point, said preventing means applying a filling material to the optical waveguides to adhere thereto, said filling material holding the waveguides together to prevent untwisting and unstranding of the waveguides until at least the jacket is applied thereto.

14. In a device according to claim 13, wherein the means for preventing comprises a funnel-shaped receptacle having an opening in the bottom and being arranged to surround the stranding point, said receptacle being filled with said filling material so that the elements approaching the stranding point are coated with the filling material and are passed through the opening as a stranded bundle.

15. In a device according to claim 13, wherein the means for applying a jacket comprises at least one extruder disposed after the means for preventing to extrude a jacket around the stranded bundle.

16. In a device according to claim 13, wherein the means for stranding includes a tube store disposed on a vertical axis forming a stranding unit for stranding the waveguides into the stranded bundle.

* * * * *